Aug. 22, 1961   D. F. TJERNLUND   2,996,825
FISHING ROD TIP WITH ANTI-TANGLING MEANS
Filed Sept. 11, 1958
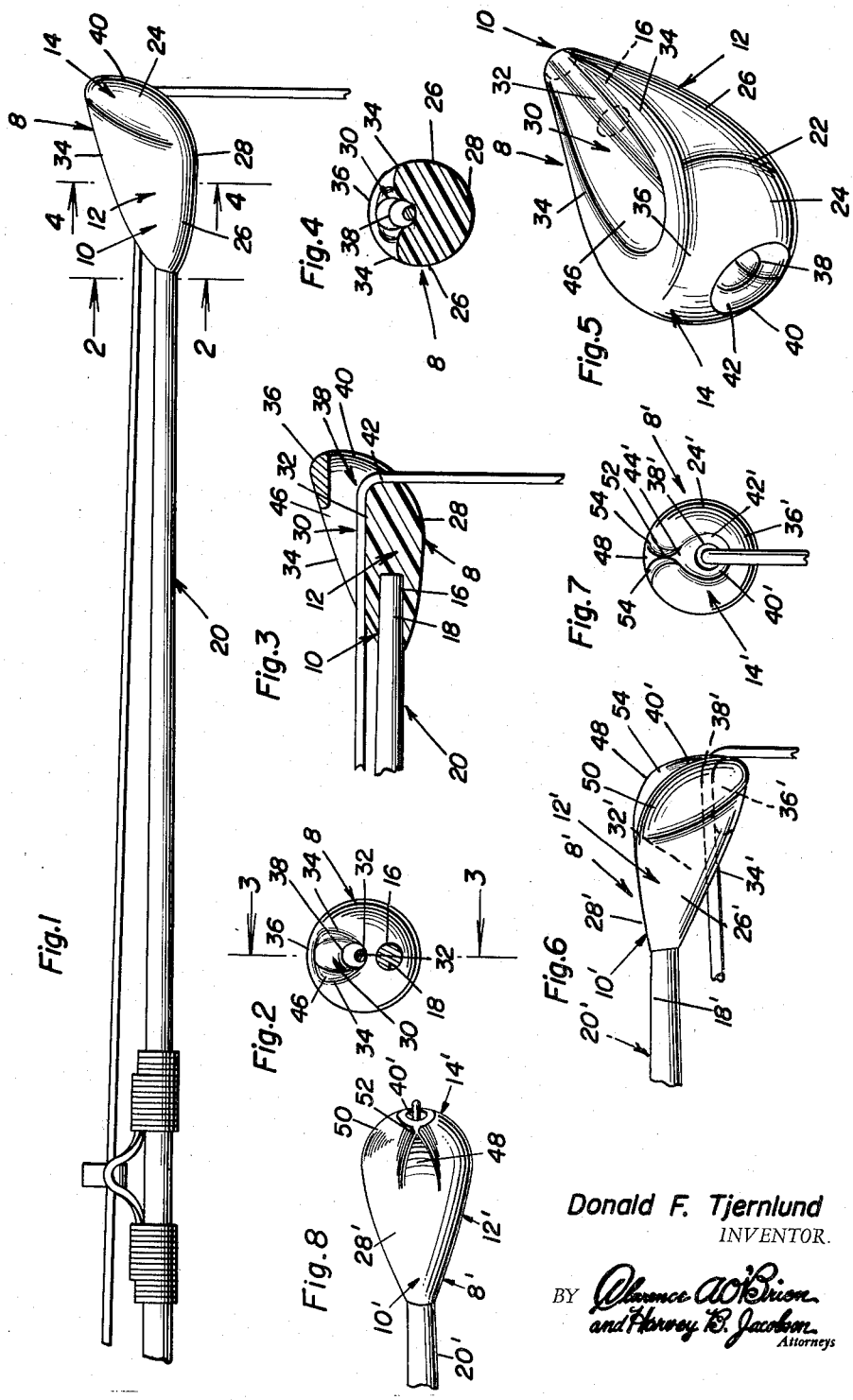
Donald F. Tjernlund
INVENTOR.
BY *Clarence A. O'Brien*
and *Harvey B. Jacobson*
Attorneys United States Patent Office 2,996,825
Patented Aug. 22, 1961

2,996,825
FISHING ROD TIP WITH ANTI-TANGLING MEANS
Donald F. Tjernlund, Milwaukee, Wis.
(P.O. Box 171, Koppel, Pa.)
Filed Sept. 11, 1958, Ser. No. 760,406
2 Claims. (Cl. 43—24)

This invention relates to a fishing rod tip embodying novel line guiding and controlling means; more particularly a structurally distinct tip which, while it lends itself to practical and reliable use on any type of fishing rod, functions to best advantage on a casting rod with the guide eye up, and on a fly rod with the guide eye down.

The primary objective is to enable a fisherman to satisfactorily cope with free swinging line winding and tangling difficulties which are now encountered when using tips and guide eyes which are currently being marketed. Take, for example, the fisherman who may be fishing for brook trout and assume that his rod tip is a wire loop-type. My own experiences have revealed that it was not unusual, say in a period of several hours or so, to take the steps necessary to clear away line tangles. Generally, I found it necessary to unwind the tip with my hands. Confronted with such perplexities while wading, I found it necessary to retreat to the shore or bank, set the handle on the bank, keep sand and water away from the reel, walk out to the end of a nine-foot fly rod and, as best I could, using my hands, untangle the windings from the rod and tip. These and other aspects not necessary to dwell upon gave rise to the incentives which have resulted in not only tackling the problem, but solving it by way, of course, of the tips herein disclosed.

Briefly, the invention under consideration has to do with an elongated tip embodying a tapered rigid body of non-corrosive material increasing in cross-section from the inward toward the outward end and having a reduced neck at the inward end, a stout median body portion and a head at the outward end of said body portion having a lengthwise line channeling groove in which the line may be slidingly seated, piloted forwardly, and freely payed out, an eye at the outer end of said groove, said neck having an axial socket for reception and retention of the tip-portion of a rod, the bottom of said groove being approximately parallel to the axis of said socket, and all exterior surfaces of said body being smooth and slick to resist any tendency of the cooperating portions of the line to wrap or wind around said body.

Novelty is predicated on the construction above recited and wherein the bottom, longitudinal side cheeks and the forward nose-like surface of the head are of requisite convexity, so as to further minimize line tangling and fouling by warding off and deflecting the line by way of these convex surfaces.

The invention also features the stated construction wherein the side walls which define the channel or groove have lengthwise edges which slope upwardly and forwardly and are such that the groove is deepened at its junctional connection with the rearward side of the eye. Also these edges are smooth surfaced and slick to resist line looping tendencies.

Other objects, features and advantages will become more readily apparent from the following description and the accompanying drawing.

In the drawing:

FIG. 1 is a side elevational view of a fishing rod with the improved anti-tangling tip mounted on the rod.

FIG. 2 is a section on the vertical line 2—2 of FIG. 1.

FIG. 3 is a view at right angles to FIG. 2 taken on the section line 3—3 of FIG. 2.

FIG. 4 is a cross-section taken centrally on the section line 4—4 of FIG. 1.

FIG. 5 is a perspective view, on an enlarged scale, of the tip by itself.

FIG. 6 is a view similar to FIG. 1 with the rod appearing fragmentarily, with the tip directed down and featuring an anti-fouling ridge on the crest of the head.

FIG. 7 is a front elevational view of the modification shown in FIG. 6.

FIG. 8. is a plan view of the modified form of the invention depicted in FIGS. 6 and 7, respectively.

As previously mentioned the improved tip may be used on either casting or fly rods and turned up as seen in FIG. 1 under certain conditions and down as seen in FIG. 6 under other conditions. The form of the invention appearing in FIGS. 1 to 5, inclusive, may be said to be one embodiment, while the forms seen in FIGS. 6, 7 and 8 may be construed as a second embodiment. However, both forms or embodiments are much the same except in respect to a crest ridge featured in FIGS. 6, 7 and 8. With reference first to FIGS. 1 to 5 the rod tip as an entity is denoted by the numeral 8 and although it may be constructed from chromium-coated metal, or polished steel or the like, it is preferably made from clear commercial plastics. The preferred embodiment is of the one-piece construction illustrated and may be produced by regular plastic injection molding procedures.

The tip is characterized by an elongated tapering molded body having the unique shape illustrated and characterized by a neck of reduced cross-section as at 10, a median body portion 12 and a head 14. The neck is provided with an axial socket closed at the forward end, said socket denoted at 16 (FIG. 3) and being axially arranged to accommodate the tip 18 of the fishing rod 20. The tip increases in cross-section from the inward or rearward toward the forward or outward end and the front part of the body portion is of greatest cross-section and is described as stout. The junctional portion 22 (FIG. 5) between the body portion and head merges with the head and the face of the head is of convex form as at 24 and cooperates with the convex exterior cheeks 26 of the side walls and the longitudinal convex bottom 28. A lengthwise groove is open at its opposite ends and is formed by way of a molded recess or cavity generally denoted at 30 in FIG. 5. This groove serves to channel the line from the rearward toward the forward end of the tip and the bottom of the groove is denoted at 32 and is parallel (see FIG. 3) with the axis of the socket 16. The lengthwise side walls which define the groove have their upper edges suitably convex and rounded off at 34 (FIG. 4) and these edges slant forwardly and outwardly where they gradually deepen the depth of the channel or groove and where at the forward ends they are connected by a bridge 36 which defines an eye. The eye is approximately at right angles to the groove or channel. This eye is however counterbored so that the line intake portion of the opening (FIG. 5) is of smaller diameter as denoted at 38. The larger discharge portion of the opening is denoted at 40 and the intervening endless wall portion is beveled and convex as at 42. The upper end portion of the beveled surface 42 is elongated giving the eye a somewhat ovate appearance in front elevation. The interior surfaces of the channel or groove walls are dished and of concave formation as denoted at 46 in FIG. 5. All of these surfaces are nicely formed and smooth and because of the material used are slick and they cooperatively assist in deflecting and warding off the line and consequently reduce the tendency of the line to form itself into loops or turns that might twirl into loops and consequent tangles. Stated otherwise these cooperating surfaces forming the convex nose 24 and the convex cheeks and bottom and convex edge portions 34 properly sloped, all minimize the likelihood of line tangling by not only deflecting but "shedding" the line that might come into contact therewith.

With reference to FIGS. 6, 7 and 8 it will be noted that the fishing line is beneath the rod 20'. Therefore, the tip 8' is upside-down compared to FIGS. 1 to 5, respectively. This tip also embodies a reduced neck 10', median body portion 12' and head 14'. The tip portion of the rod 20' fits into a socket (not shown) but like aforementioned socket 16 (FIG. 3).

The face 24' of the head is convex and provides an anti-tangling nose. The side surfaces 26' are slick and smooth to resist any tendency of the line to wrap around the body portion 12'. The longitudinal top side or surface 28' is convex. The groove 32' serves to channel the line from the rearward to the forward end and the lengthwise side walls are suitably rounded and the longitudinal edges 34' slope upwardly and rearwardly toward the fishing rod (FIG. 6). The forward end portions of the side walls are connected by a bridge 36'. This construction defines an eye the smaller diameter of which is designated at 38' (FIG. 7). The larger discharge portion of the eye is designated at 40' and the bevelled surface is denoted at 42'. As shown in FIG. 7 the eye tends to be ovate in front elevation by reason of a crotch as at 44. A generally V-shaped rib or ridge 48 is formed centrally atop the convex crest portion 50 and the leading vertex 52 is aligned with the crotch 44'. The forwardly converging side edges 54 are suitably bevelled to assist in accomplishing the anti-tangling result. Should the line tend to sweep over the crest 50 from either left or right it will strike the ridge 48, come to rest and slip away and return to its proper position relative to the eye opening 38'.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use on either a casting rod or fly rod, as the case may be; a rod tip for attaching and guiding a free-swinging line comprising an elongated tip embodying a tapered rigid body of non-corrosive material increasing in cross-section from the inward end toward the outward end and having a neck of reduced cross-section at said inward end, a stout median body portion, and a head at the outward end of said body portion having a lengthwise line channeling groove in which the line may be slidingly seated, piloted forwardly and freely payed out, an eye at the outer end of said groove, said neck having an axial socket for reception and retention of the tip-portion of a rod, the bottom of said groove being approximately parallel to the axis of said socket, and all exterior surfaces of said body being smooth and slick to resist any tendency of the cooperating portions of the line to wrap or to stay wrapped around said body, the leading surface of said head being convex and providing a line anti-tangling nose and the crest of said head having an upstanding anti-fouling ridge, said ridge being V-shaped, the vertex of said ridge merging with an adjacent marginal portion of the eye's opening, the lengthwise sides of said ridge being beveled, that portion of the opening of said eye contiguous to and aligned with said vertex having a restricted V-shaped crotch also functioning as a loop-resisting line motion check.

2. For use on a casting rod or a fly rod, as the case may be; a rod tip for attaching and guiding a free-swinging line comprising an elongated tip embodying a tapered rigid body of non-corrosive material increasing in cross-section from an inward end toward an outward end and providing a neck of reduced cross-section at said inward end, a median body portion, and a head at the outward end, said body portion having a lengthwise line channeling groove in which the line may be slidingly seated, piloted forwardly and freely payed out, an eye at the outer end of said groove, said neck having a straight axial socket for the reception and retention of the tip-portion of a rod, the bottom of said groove being spaced from but approximately parallel to the axis of said socket, all exterior surfaces of said body being smooth and slick to resist any tendency of the line to wrap or wind around said body, said body having a bottom and longitudinal side-cheeks, said head having a forward nose-like surface, said bottom, side cheeks and nose-like surface all being convex to further minimize line tangling and fouling, said channeling groove having line guiding and confining walls and said walls having edges sloping upwardly and forwardly relative to the bottom of the groove and gradually and progressively increasing the depth of the groove at its junctional connection with the rearward side of said eye, said edges being smooth surfaced and also slick, said groove being ovate in plan with its narrower end disposed toward the neck, the bottom of the groove being longitudinally straight, the respective ends of the groove being open and interior surfaces being dished, the axis of said eye being in a plane above the plane of the bottom of said groove and the line intake side of the eye opening being of a diameter less than the diameter of the outlet side of said eye opening, the marginal edge of said opening flaring outwardly, and a nib-like ridge provided on the crest of said head, said ridge serving as a line-check, whereby to check the line, if it tends to wipe in a circular motion from left to right, or vice versa, over the surfaces of said crest and lessening the likelihood of the line-wrapping and tangling.

References Cited in the file of this patent

UNITED STATES PATENTS

| | | |
|---|---|---|
| 58,833 | Isaacs | Oct. 16, 1866 |
| 277,230 | Chubb | May 8, 1883 |
| 1,665,063 | Magrath | Apr. 3, 1928 |
| 2,262,300 | Reynolds | Nov. 11, 1941 |
| 2,544,238 | Ritter | Mar. 6, 1951 |
| 2,792,660 | Jennette | May 21, 1957 |